United States Patent
Toyoda et al.

(10) Patent No.: US 6,538,234 B2
(45) Date of Patent: Mar. 25, 2003

(54) GAS SHIELDED ARC WELDING METHOD

(75) Inventors: Kazuhiro Toyoda, Chita (JP); Noboru Yamamoto, Nagoya (JP); Shigeo Hanajima, Handa (JP)

(73) Assignee: Daido Tokushuko Kabushiki Kaisha, Aichi (JP)

( * ) Notice: Subject to any disclaimer, the term of this patent is extended or adjusted under 35 U.S.C. 154(b) by 0 days.

(21) Appl. No.: 09/897,097

(22) Filed: Jul. 3, 2001

(65) Prior Publication Data
US 2002/0017504 A1 Feb. 14, 2002

(30) Foreign Application Priority Data
Jul. 7, 2000 (JP) .......................... 2000-207425

(51) Int. Cl.$^7$ .............................. B23K 9/173
(52) U.S. Cl. ................ 219/137 WM; 219/74; 219/137.42
(58) Field of Search ............. 219/74, 75, 137.42, 219/137 WM

(56) References Cited
U.S. PATENT DOCUMENTS

| | | | | |
|---|---|---|---|---|
| 2,859,329 A | * | 11/1958 | Lesnewich | 219/74 |
| 2,876,329 A | * | 3/1959 | Stanchus | 219/74 |
| 3,102,944 A | * | 9/1963 | Chyle | 219/73 |
| 4,527,038 A | * | 7/1985 | Cuny et al. | 219/75 |
| 4,673,792 A | * | 6/1987 | Gartland et al. | 219/74 |
| 5,591,356 A | * | 1/1997 | Sakuragi et al. | 219/121.5 |
| 5,614,117 A | * | 3/1997 | Krobath | 219/147 |

* cited by examiner

Primary Examiner—M. Alexandra Elve
Assistant Examiner—Kevin P. Kerns
(74) Attorney, Agent, or Firm—Bacon & Thomas, PLLC

(57) ABSTRACT

Gas shielded arc welding is performed using gas nozzle 10 which includes a straight portion 14 that permits the shielding gas flows from orifices 18 to flow parallel to the axial direction and a constricted portion 20 continuous from the straight portion 14 that constricts the gas flows from the straight portion 14 as they travel toward the distal end and the nozzle 10 satisfies the following relations (1) and (2):

$$1.5 \leq (D_p/D_o) \leq 2.5 \quad (1)$$

$$1.0 \leq (L/D_p) \quad (2)$$

where $D_p$ is the inside diameter of the straight portion 14, $D_o$ is the inside diameter of the distal gas outlet of the constricted portion 20, and L is the axial length of the constricted portion 20.

6 Claims, 2 Drawing Sheets

GAS SHIELDED ARC WELDING METHOD

BACKGROUND OF THE INVENTION

This invention relates to a gas shielded arc welding method suitable for application to the welding of aluminum or aluminum alloys, magnesium or magnesium alloys, as well as titanium or titanium alloys, in particular to the welding of titanium and titanium alloys.

Active metals such as titanium and titanium alloys have high affinity for oxygen and nitrogen, so if air entrapment occurs during welding, they absorb the oxygen and nitrogen in the air and the weld is contaminated to have a brittle structure. Therefore, titanium and titanium alloys are commonly welded by gas shielded arc welding with a shielding gas being blown through a nozzle against the area being welded.

One applicable method of gas shielded arc welding is the MIG (metal inert gas) process in which a welding wire as a consumable electrode also working as a filler metal is passed through a hole in a contact tip fitted within the gas nozzle and an electric current is applied to the wire as it is melted to permit welding. The conventional MIG process, however, suffers from the disadvantage of being unable to achieve satisfactory welding in titanium and titanium alloys.

The gas nozzle used in the conventional MIG process is a pipe having a uniform inside diameter throughout from the orifices to the distal gas outlet. The shielding gas, particularly the circumference of its flux, that has been ejected from the nozzle (the gas is usually argon or helium having a smaller specific gravity than $CO_2$) deviates outward halfway its travel toward the area to be welded; as a result, the area to be welded is insufficiently shielded from the surrounding air that the atmospheric oxygen and nitrogen are entrapped in the weld to produce a defective structure and this is probably the reason for the above-mentioned poor performance of the conventional MIG process.

SUMMARY OF THE INVENTION

The gas shielded arc welding method of the invention has been developed in order to solve the aforementioned problem of the conventional MIG process.

The first embodiment of the method is for performing arc welding with a shielding gas being ejected from a nozzle, characterized in that the nozzle comprises a straight portion that permits the shielding gas flows from orifices to flow parallel to the axial direction and a constricted portion continuous from the straight portion that constricts the gas flows from the straight portion as they travel toward the distal end, the nozzle satisfying the following relations (1) and (2):

$$1.5 \leq (D_p/D_o) \leq 2.5 \quad (1)$$

$$1.0 \leq (L/D_p) \quad (2)$$

where $D_p$ is the inside diameter of the straight portion, $D_o$ is the inside diameter of the distal gas outlet of the constricted portion, and L is the axial length of the constricted portion.

As the second embodiment of the invention, the method above may be controlled so that the nozzle further satisfies the following relation (3):

$$1.3 \leq (L_s/D_p) \quad (3)$$

where $L_s$ is the axial length of the straight portion.

As the third embodiment of the invention, the methods above are to weld any one active metal selected from among titanium, titanium alloys, aluminum, aluminum alloys, magnesium and magnesium alloys.

DETAILED DESCRIPTION OF THE INVENTION

Figure 1:
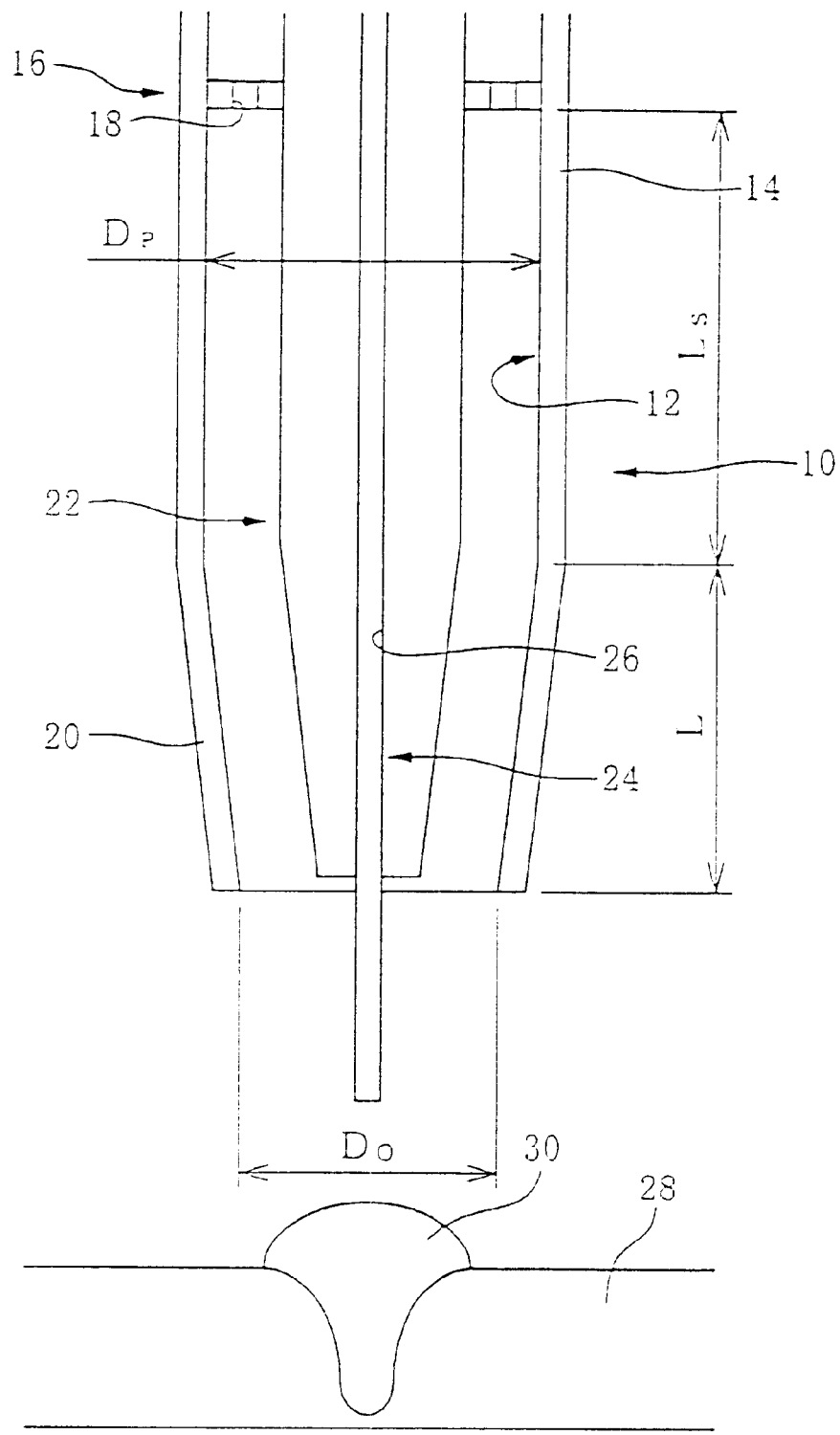
FIG. 1 shows schematically the welding method of the invention in a typical mode.

FIG. 1 shows schematically the gas shielded arc welding method of the invention in a typical mode. In this Figure, numeral 10 denotes a gas nozzle, 12 its internal gas channel, 14 the straight portion of the nozzle 10 in which the flows of a shielding gas coming through orifices 18 in a rectifier 16 are converted to a laminar flow parallel to the axial direction, and 20 represents the constricted portion of the nozzle 10 which constricts the gas flows as they travel toward the distal end.

Numeral 22 represents a contact tip fitted in the center of the gas nozzle 10, 24 is a welding wire passed through the center hole 26 in the contact tip 22, 28 is a parent metal, and 30 is the weld metal.

Symbols $D_p$ and $L_s$ represent the inside diameter and axial length, respectively, of the straight portion 14, $D_o$ the inside diameter of the distal gas outlet of the constricted portion 20, and L represents the axial length of the constricted portion 20.

It has been confirmed that the method of the invention is effective in welding active metals such as titanium and titanium alloys and provides satisfactory structures in the weld. The reason would be as follows.

Figure 2A:
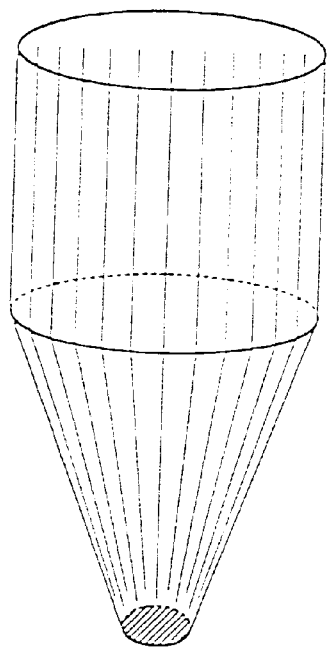
FIGS. 2A, 2B and 2C illustrate how the gas nozzle shown in FIG. 1 works.
Figure 2B:
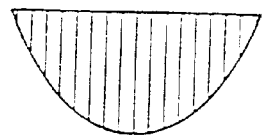
Figure 2C:
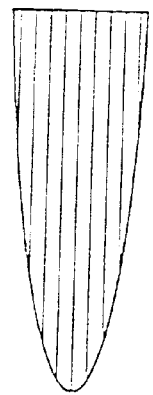

FIG. 2A shows in conceptual form the shielding gas flowing through the nozzle 10; FIG. 2B and FIG. 2C show in conceptual form the velocity distributions of the gas flows in the straight portion 14 and the constricted portion 20, respectively, of the nozzle 10. Obviously, the gas flows in the straight portion 14 are parallel to each other and span broadly whereas the gas flows in the constricted portion 20 progressively narrow down toward the distal end and the velocity of the central flow relative to that of the peripheral flow is faster than in the case of the gas flows in the straight portion 14.

Thus, the gas flows are sharpened to become highly directional as they pass through the straight portion 14 and the constricted portion 20 consecutively; as a result, the gas flows emerging from the nozzle 10 are effectively directed more to the area to be welded (i.e., to be shielded from air) than to the other areas, thereby assuring satisfactory isolation and, hence shielding, of that area from the atmosphere.

To this end, $D_p$, $D_o$ and L must satisfy the relations (1) and (2). First, the degree of constriction that is achieved by the constricted portion 20 and which is expressed by the ratio between $D_p$ (the inside diameter of the straight portion 14) and $D_o$ (the inside diameter of the distal gas outlet of the constricted portion 20) must be at least 1.5. If $D_p/D_o$ is smaller than 1.5, the shielding gas flow is not sufficiently constricted to achieve satisfactory welding. If $D_p/D_o$ is greater than 2.5, the constricting effect is so great that the laminar gas flow emerging from the straight portion 14 becomes turbulent as it passes through the constricted portion 20, making it impossible for the gas flow coming out of the nozzle 10 to be projected to the weld with high momentum and directionality.

Thus, it is important for the purposes of the invention that the gas flow emerging from the straight portion 14 should keep the laminar state as much as possible as it passes through the constricted portion 20 to be projected to the weld. If the gas flow becomes turbulent as it passes through the constricted portion 20, its momentum is so much reduced that the gas emerging from the nozzle 10 becomes less vigorous and soon spreads in turbulence to become no longer capable of assuring effective shield of the weld.

Another important factor to the invention is L, or the axial length of the constricted portion 20 and $L/D_p$ must be at least 1.0. If $L/D_p$ is smaller than 1.0, the gas flows are constricted so sharply that they become turbulent and the welding cannot be performed under a satisfactory shield for the reason just mentioned above. If $L/D_p$ is excessive, no effective constriction is achieved, making it difficult to perform satisfactory welding. In practical applications, $L/D_p$ is desirably adjusted to be no more than 3.0.

In another desired embodiment of the invention, $L_s/D_p$ or the ratio between $L_s$, the axial length of the straight portion 14, and its inside diameter $D_p$ is at least 1.3. This is effective in ensuring that the gas coming in through the orifices 18 can be converted to a laminar flow in the straight portion 14. The laminar flow creating effect is not affected if $L_s/D_p$ becomes excessive; however, the welding torch becomes longer than necessary and disadvantages will result such as a smaller degree of freedom in the welding position. Therefore, $L_s/D_p$ is desirably adjusted to be no greater than 3.5.

As will be apparent from the foregoing description, the present invention is suitably applied as a method for welding active metals such as titanium or titanium alloys, aluminum or aluminum alloys, and magnesium or magnesium alloys.

An example of the invention will now be described in detail. MIG welding was performed on pure titanium (parent metal 28) using a 1-mm dia. welding wire 24 having the chemical composition shown in Table 1. During the welding, $D_p$, $D_o$, $L_s$ and L of the gas nozzle 10 (see FIG. 1) were variously adjusted to evaluate weldability and weld strength. The results are shown in Tables 2, 3 and 4. Pure argon was used as the shielding gas and blown from the nozzle 10 at a rate of 20 L/min. The welding current and voltage were 90 A and 21 V, respectively.

TABLE 1

Chemistry of Welding Wire (wt %)

| Wire | H | O | N | C | Fe | Pd | Al | V | Sn | Ti |
|---|---|---|---|---|---|---|---|---|---|---|
| YTW 28 | ≦0.008 | ≦0.10 | ≦0.02 | — | ≦0.20 | — | — | — | — | bal. |

TABLE 2

| | | Comp. sample 1 | Invention sample 1 | Invention sample 2 | Invention sample 3 | Comp. sample 2 |
|---|---|---|---|---|---|---|
| Nozzle size and Shape | $D_P$ (mm) | 16 | 16 | 16 | 16 | 16 |
| | $D_O$ (mm) | 16.0 | 11.0 | 8.0 | 6.5 | 5.0 |
| | $D_P/DO$ | 1.0 | 1.5 | 2.0 | 2.5 | 3.2 |
| | L (mm) | 0 | 20 | 20 | 20 | 20 |
| | $L/D_P$ | 0 | 1.25 | 1.25 | 1.25 | 1.25 |
| | $L_S$ (mm) | 49 | 29 | 29 | 29 | 29 |
| | $L_S/D_P$ | 3.1 | 1.8 | 1.8 | 1.8 | 1.8 |
| Weldability | arc stability | x | ○ | ○ | ○ | Δ |
| | spattering | x | ○ | ○ | ○ | Δ |
| | bead shape | x | ○ | ○ | ○ | Δ |
| | bead's appearance | x | ○ | ○ | ○ | x |
| Characteristics* | tensile strength | 235 | 430 | 433 | 429 | 287 |
| | rupture in | weld metal | parent metal | parent metal | parent metal | weld metal |
| | Rating | x | ○ | ○ | ○ | x |

Note:
The asterisk (*) refers to the results of a tensile test on a joint (to evaluate weld strength).

TABLE 3

| | | Comp. sample 1 | Invention sample 1 | Invention sample 2 | Invention sample 3 | Comp. sample 2 |
|---|---|---|---|---|---|---|
| Nozzle size and Shape | $D_P$ (mm) | 16 | 16 | 16 | 16 | 16 |
| | $D_O$ (mm) | 8.0 | 8.0 | 8.0 | 8.0 | 8.0 |
| | $D_P/DO$ | 2.0 | 2.0 | 2.0 | 2.0 | 2.0 |
| | L (mm) | 14 | 16 | 24 | 30 | 32 |
| | $L/D_P$ | 0.88 | 1 | 1.5 | 1.88 | 2 |
| | $L_S$ (mm) | 30 | 30 | 30 | 30 | 30 |
| | $L_S/D_P$ | 1.9 | 1.9 | 1.9 | 1.9 | 1.9 |
| Weldability | arc stability | x | ○ | ○ | ○ | ○ |
| | spattering | x | ○ | ○ | ○ | ○ |
| | bead shape | x | ○ | ○ | ○ | ○ |
| | bead's appearance | x | ○ | ○ | ○ | ○ |

TABLE 3-continued

|  |  | Comp. sample 1 | Invention sample 1 | Invention sample 2 | Invention sample 3 | Comp. sample 2 |
|---|---|---|---|---|---|---|
| Characteristics* | tensile strength | 235 | 408 | 403 | 429 | 416 |
|  | rupture in | weld metal | parent metal | parent metal | parent metal | parent metal |
|  | Rating | x | ○ | ○ | ○ | ○ |

Note:
The asterisk (*) refers to the results of a tensile test on a joint (to evaluate weld strength).

TABLE 4

|  |  | Invention sample 1 | Invention sample 2 | Invention sample 3 | Invention sample 4 | Invention sample 5 |
|---|---|---|---|---|---|---|
| Nozzle size and Shape | $D_P$ (mm) | 16 | 16 | 16 | 16 | 16 |
|  | $D_O$ (mm) | 7.0 | 7.0 | 7.0 | 7.0 | 7.0 |
|  | $D_P/DO$ | 2.3 | 2.3 | 2.3 | 2.3 | 2.3 |
|  | L (mm) | 20 | 20 | 20 | 20 | 20 |
|  | $L/D_P$ | 1.25 | 1.25 | 1.25 | 1.25 | 1.25 |
|  | $L_S$ (mm) | 16 | 21 | 24 | 32 | 46 |
|  | $L_S/D_P$ | 1 | 1.3 | 1.5 | 2 | 2.9 |
| Weldability | arc stability | ○ | ○ | ○ | ○ | ○ |
|  | spattering | ○ | ○ | ○ | ○ | ○ |
|  | bead shape | ○ | ◎ | ◎ | ◎ | ◎ |
|  | bead's appearance | ○ | ◎ | ◎ | ◎ | ◎ |
| Characteristics* | tensile strength | 402 | 399 | 418 | 429 | 416 |
|  | rupture in | parent metal | parent metal | parent metal | parent metal | parent metal |
|  | Rating | ○ | ◎ | ◎ | ◎ | ◎ |

Note:
The asterisk (*) refers to the results of a tensile test on a joint (to evaluate weld strength).

In the above Tables, symbols mean as follows.
◎: Excellent
○: Good
Δ: Fair
X: Poor As one can see from the data in Tables 2–4, titanium as an active metal could be effectively welded by MIG when the gas nozzle 10 was adapted to have the constricted portion 20 continuous from the straight portion 14, with its parameters $D_p$, $D_o$, $L_s$ and L being set in accordance with the invention.

Figure 3:
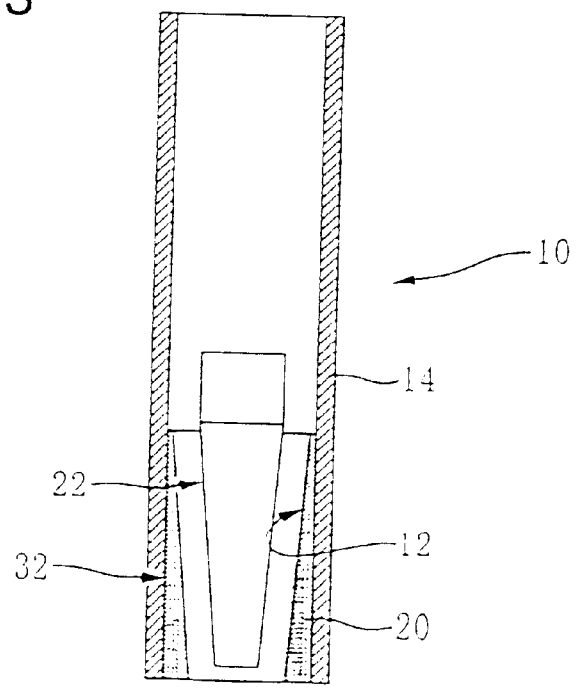
FIG. 3 shows another configuration of the gas nozzle used in the invention.

While an example of the present invention has been described above in detail, it is just one example and various modifications can be made. For instance, FIG. 1 shows just one example of the gas nozzle 10, in which the distal end of a pipe is tapered to form the constricted portion 20. Another design for forming the constricted portion 20 of the gas nozzle 10 is shown in FIG. 3, in which a straight pipe is fitted in the distal end portion with a tubular packing 32 having a tapered or otherwise shaped inner surface. Needless to say, the packing 32 may have various non-tubular shapes.

In the Example, pure titanium was welded but the concept of the invention is also applicable to the welding of other active metals such as aluminum, aluminum alloys, magnesium and magnesium alloys and the present inventors obtained satisfactory results in melting these metals. Various other modifications can of course be made without departing from the scope and spirit of the invention.

As described on the foregoing pages, if the gas nozzle 10 is adapted to have the constricted portion 20 continuous from the straight portion 14 such that it satisfies the relations (1) and (2), arc welding can be performed with the weld being effectively shielded by inert gas so that entrapment of atmospheric oxygen and nitrogen in the weld is adequately suppressed to produce a sound weld structure.

Having this advantage, the present invention proves most effective in welding active metals such as aluminum or aluminum alloys, magnesium or magnesium alloys, titanium or titanium alloys, particularly titanium and titanium alloys.

While the invention has been described in detail and with reference to specific embodiments thereof, it will be apparent to one skilled in the art that various changes and modifications can be made therein without departing from the spirit and scope thereof.

This application is based on Japanese patent application No. 2000-207425 filed on Jul. 7, 2000, the entire contents thereof being hereby incorporated by reference.

What is claimed is:

1. A gas shielded arc welding nozzle comprising:

a straight portion;

a constricted portion continuous from said straight portion and having a distal end terminating said nozzle; and a plurality of orifices disposed in said straight portion and configured to discharge a gas flow therefrom into said straight portion;

wherein said straight portion shields the gas flow discharged from the orifices to the constricted portion which constricts the gas flow along the length thereof and projects the gas flow through the distal end;

wherein the nozzle satisfies the following relationships:

$$1.5 \leq (D_p/D_o) \leq 2.5 \quad (1)$$

$$1.0 \leq (L/D_p) \quad (2)$$

such that $D_p$ is defined as the inside diameter of the straight portion, $D_o$ is defined as the inside diameter of the distal gas outlet of the constricted portion, and L is defined as the axial length of the constricted portion.

2. The gas shielded arc welding nozzle according to claim 1 having a contact tip contained by said nozzle and axially aligned and concentric therewith, said contact tip having a welding wire passed through a center hole defined along the axis thereof, said contact tip terminating near the distal end of the constricted portion.

3. The gas shielded arc welding nozzle according to claim 1 wherein the nozzle further satisfies the following relationship:

$$1.3 \leq (L_s/D_p) \qquad (3)$$

wherein $L_s$ is defined as the axial length of the straight portion.

4. The gas shielded arc welding nozzle according to claim 3 having a contact tip contained by said nozzle and axially aligned and concentric therewith, said contact tip having a welding wire passed through a center hole defined along the axis thereof, said contact tip terminating near the distal end of the constricted portion.

5. A method of welding at least one active metal comprising the step of using the gas shielded arc welding nozzle of claim 1 or 3 to weld at least one active metal selected from the group consisting of titanium, titanium alloys, aluminum, aluminum alloys, magnesium and magnesium alloys.

6. A gas shielded arc welding nozzle according to claim 1 further comprising a straight pipe having a tubular packing fitted in a distal portion thereof defining the constricted portion of the nozzle.

* * * * *